(12) United States Patent
Lassoued et al.

(10) Patent No.: US 11,587,001 B2
(45) Date of Patent: Feb. 21, 2023

(54) REBALANCING AUTONOMOUS VEHICLES ACCORDING TO LAST-MILE DELIVERY DEMAND

(71) Applicant: International Business Machines Corporation, Armonk, NY (US)

(72) Inventors: Yassine Lassoued, Dublin (IE); Julien Monteil, Dublin (IE); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 16/743,001

(22) Filed: Jan. 15, 2020

(65) Prior Publication Data

US 2021/0216929 A1 Jul. 15, 2021

(51) Int. Cl.
| | |
|---|---|
| *G06Q 10/06* | (2012.01) |
| *G01C 21/34* | (2006.01) |
| *G01C 21/36* | (2006.01) |
| *G05D 1/00* | (2006.01) |
| *G06Q 10/0631* | (2023.01) |

(52) U.S. Cl.
CPC ..... *G06Q 10/06312* (2013.01); *G01C 21/343* (2013.01); *G01C 21/3469* (2013.01); *G01C 21/3605* (2013.01); *G05D 1/0027* (2013.01); *G05D 1/0088* (2013.01); *G06Q 10/06315* (2013.01); *G05D 2201/0213* (2013.01)

(58) Field of Classification Search
CPC ............ G05D 1/0005; G05D 2201/00; G05D 1/0088; G05D 1/0027; G06Q 50/30; G06Q 10/06311; G06Q 10/08355; G06Q 10/0834; G06Q 10/0631; G06Q 10/083; G06Q 10/06316; G06Q 10/02; G06Q 10/047; G06Q 10/06315; G08G 5/0069; G08G 1/20; G08G 1/202
See application file for complete search history.

(56) References Cited

U.S. PATENT DOCUMENTS 5,265,006 A * 11/1993 Asthana ................ G06Q 10/08
705/7.22
5,636,122 A * 6/1997 Shah ...................... G08G 1/127
701/454

(Continued)

FOREIGN PATENT DOCUMENTS

| CN | 105302158 A | 2/2016 |
|---|---|---|
| WO | 2018065977 A1 | 4/2018 |

OTHER PUBLICATIONS

Moshref-Javadi, Mohammad et al., A truck and drones model for last-mile delivery: A mathematical model and heuristic approach, Applied Mathematical Modeling, vol. 20, 2020 (Year: 2020).*

(Continued)

*Primary Examiner* — Scott L Jarrett
(74) *Attorney, Agent, or Firm* — David K. Mattheis; Maeve Carpenter

(57) ABSTRACT

Distributing and rebalancing crewless vehicles (CV) by receiving a CV demand-availability gap, identifying candidate CV to relocate to close the CV demand-availability gap, identifying a candidate transport to relocate the CV to close the CV demand-availability gap, generating a candidate CV relocation plan, optimizing an overall CV relocation plan, and executing the overall CV relocation plan.

18 Claims, 5 Drawing Sheets

(56) References Cited

U.S. PATENT DOCUMENTS

| | | | |
|---|---|---|---|
| 5,922,040 A * | 7/1999 | Prabhakaran | G08G 1/127 701/532 |
| 9,384,668 B2 | 7/2016 | Raptopoulos | |
| 9,595,018 B2 * | 3/2017 | Carvajal | H04W 4/029 |
| 9,704,409 B2 | 7/2017 | Prakash | |
| 9,792,576 B1 | 10/2017 | Jamjoom | |
| 9,805,431 B2 * | 10/2017 | Scicluna | G06Q 10/06315 |
| 9,816,824 B1 * | 11/2017 | Racah | G01C 21/343 |
| 9,950,814 B1 | 4/2018 | Beckman | |
| 9,953,539 B1 * | 4/2018 | Gkiotsalitis | G06N 5/003 |
| 9,984,347 B2 | 5/2018 | Dreano, Jr. | |
| 10,142,255 B1 * | 11/2018 | Pachon | G06Q 10/08355 |
| 10,331,124 B2 * | 6/2019 | Ferguson | G06V 20/584 |
| 10,580,311 B2 * | 3/2020 | Schmalzried | G08G 5/0069 |
| 10,703,382 B2 * | 7/2020 | Sweeney | B60W 60/005 |
| 10,740,701 B2 * | 8/2020 | Zhang | G06Q 50/30 |
| 10,775,806 B2 * | 9/2020 | Abari | G01C 21/3438 |
| 10,783,466 B2 * | 9/2020 | Yao | G06Q 10/06311 |
| 11,055,638 B1 * | 7/2021 | Mendes | G06F 21/32 |
| 11,132,626 B2 * | 9/2021 | Ryan | G06Q 20/145 |
| 11,250,372 B2 * | 2/2022 | Pike | G06Q 10/0834 |
| 11,366,470 B2 * | 6/2022 | Panigrahi | B60L 53/66 |
| 2002/0019760 A1 * | 2/2002 | Murakami | G06Q 10/08 705/7.25 |
| 2002/0156553 A1 * | 10/2002 | Read | G06Q 30/02 701/1 |
| 2003/0014288 A1 * | 1/2003 | Clarke | G06Q 10/047 705/400 |
| 2004/0010338 A1 * | 1/2004 | Ogura | G06Q 10/02 700/214 |
| 2007/0233338 A1 * | 10/2007 | Ariyur | G05D 1/0289 701/23 |
| 2008/0195428 A1 * | 8/2008 | O'Sullivan | G06Q 10/02 705/6 |
| 2014/0011522 A1 * | 1/2014 | Lin | H04W 4/02 455/456.2 |
| 2015/0012320 A1 * | 1/2015 | Juckett | G06Q 10/0631 705/7.16 |
| 2015/0142497 A1 * | 5/2015 | Osumi | G08G 1/127 705/7.23 |
| 2015/0227871 A1 * | 8/2015 | Zeile | G06Q 50/30 705/7.13 |
| 2015/0310379 A1 * | 10/2015 | Farrelly | G06Q 30/0203 705/7.15 |
| 2015/0370251 A1 | 12/2015 | Siegel | |
| 2016/0019497 A1 * | 1/2016 | Carvajal | H04L 67/104 705/333 |
| 2016/0107750 A1 | 4/2016 | Yates | |
| 2016/0196525 A1 | 7/2016 | Kantor | |
| 2016/0196756 A1 | 7/2016 | Prakash | |
| 2016/0247109 A1 * | 8/2016 | Scicluna | G08G 1/202 |
| 2017/0116566 A1 * | 4/2017 | Walton | G06Q 10/087 |
| 2017/0355459 A1 | 12/2017 | Erickson | |
| 2018/0033315 A1 | 2/2018 | Winkle | |
| 2018/0074518 A1 | 3/2018 | Cantrell | |
| 2018/0101173 A1 | 4/2018 | Banerjee | |
| 2018/0143027 A1 * | 5/2018 | Schlesinger | G01C 21/343 |
| 2018/0196422 A1 | 7/2018 | Chow | |
| 2018/0211541 A1 * | 7/2018 | Rakah | G08G 1/148 |
| 2018/0224866 A1 * | 8/2018 | Alonso-Mora | G06N 5/04 |
| 2018/0231984 A1 * | 8/2018 | Alonso-Mora | G05D 1/0291 |
| 2018/0259976 A1 * | 9/2018 | Williams | G01C 21/3664 |
| 2018/0276695 A1 * | 9/2018 | Dione | G06N 20/10 |
| 2018/0286237 A1 * | 10/2018 | Hu | H04W 4/02 |
| 2018/0308191 A1 * | 10/2018 | Matthiesen | G01C 21/3438 |
| 2018/0315148 A1 * | 11/2018 | Luo | G06Q 10/06313 |
| 2018/0322775 A1 * | 11/2018 | Chase | G08G 1/012 |
| 2018/0341918 A1 * | 11/2018 | Raut | G08G 1/202 |
| 2018/0356823 A1 * | 12/2018 | Cooper | B64C 39/024 |
| 2019/0056751 A1 * | 2/2019 | Ferguson | G05D 1/0291 |
| 2019/0056752 A1 * | 2/2019 | Winkle | G05D 1/0088 |
| 2019/0108468 A1 * | 4/2019 | Nguyen | G01C 21/3415 |
| 2019/0196503 A1 * | 6/2019 | Abari | G06Q 10/00 |
| 2019/0228375 A1 * | 7/2019 | Laury | G05D 1/0088 |
| 2019/0317526 A1 * | 10/2019 | Goldman | G06Q 10/02 |
| 2019/0339709 A1 * | 11/2019 | Tay | G06F 16/29 |
| 2019/0340928 A1 * | 11/2019 | Goldman | G08G 1/202 |
| 2019/0354114 A1 * | 11/2019 | Goldman | G05D 1/0297 |
| 2020/0051001 A1 * | 2/2020 | Donnelly | G05D 1/0088 |
| 2020/0120037 A1 * | 4/2020 | Zhang | G06Q 10/06313 |
| 2020/0130829 A1 * | 4/2020 | Gandiga | G05D 1/0088 |
| 2020/0160478 A1 * | 5/2020 | Ramot | G01C 21/343 |
| 2020/0249047 A1 * | 8/2020 | Balva | G06Q 10/0631 |
| 2020/0318991 A1 * | 10/2020 | Beaurepaire | G01C 21/3685 |
| 2021/0042668 A1 * | 2/2021 | Gao | G06Q 50/30 |
| 2021/0089988 A1 * | 3/2021 | Tierney | G06Q 10/06315 |

OTHER PUBLICATIONS

Weikl S., et al., Relocation Strategies and Algorithms for free-floating Car Sharing Systems 2012 15th International IEEE Conference on Intelligent Transportation Systems, Sep. 16-19, 2012 (Year: 2012).*

Ha, Quang Minh et al., On the min-cost Traveling Salesman Problem with Drone Transportation Research Part C, vol. 86, 2018 (Year: 2018).*

Remer, Ben, Optimization of Last Mile Delivery with Unmanned Aerial Vehicle Assistance University of Delaware, Thesis, Summer 2019 (Year: 2019).*

Kek, Alviqan G.H. et al., A decision support system for vehicle relocation operations in carsharing systems Transportation Research Part E, vol. 45, 2009 (Year: 2009).*

Wallar, Alex et al, Vehicle Rebalancing for Mobility-on-Demand Systems with Ride-Sharing 2018 IEEE/RSJ International Conference on Intelligent Robots and Systems, Oct. 1-5, 2018 (Year: 2018).*

Liu, Lanyi, Optimization of Drone-Assisted Delivery System Optimization Methods in Engineering, Washington University in St. Louis, Spring 2018 (Year: 2018).*

Murray, Chase C. et al., The Flying Sidekick Traveling Salesman Problem: Optimization of Drone Assisted Parcel Delivery Transportation Research Part C, Emerging Technologies, 2015 (Year: 2015).*

Benchimol, Mike et al., Balancing the stations of self-service bike hire system RAIRO—Operations Research, EDP Sciences, 2011 (Year: 2011).*

Daknama, Rami et al., Vehicle Routing with Drones May 18, 2017 (Year: 2017).*

Chemla, Daniel et al., Bike sharing systems: Solving the static rebalancing problem Discrete Optimization, vol. 10, 2013 (Year: 2013).*

Erdogan, Gunes et al., An exact algorithm for the static rebalancing problem arising in bicycle sharing systems European Journal of Operational Research, vol. 245, 2015 (Year: 2015).*

Schuijbroek, J. et al., Inventory rebalancing and vehicle routing in bike sharing systems European Journal of Operational Research, vol. 257, 2017 (Year: 2017).*

Rainer-Harbach, Marian et al., Pilot, Grasp, and VNS approaches for static balancing of bicycle sharing systems J. Glob Optim, vol. 63, 2015 (Year: 2015).*

Spieser, Kevin et al., Shared Vehicle Mobility On Demand Systems: A Fleet Operator's Guide to Rebalancing Empty Vehicles Oct. 24, 2015 (Year: 2015).*

Di Gaspero, Luca et al., Constraint-Based Approaches for Balancing Bike Sharing Systems Principles and Practice of Constraint Programming, 19th International Conference, Sep. 2013 (Year: 2013).*

Drexl, Michael, On Some Generalized Routing Problems Oct. 2007 (Year: 2007).*

"#IBMDroneDrop", Twitter, printed on Jun. 26, 2019, 2 pages, <https://twitter.com/hashtag/IBMDroneDrop>.

Agatz et al., "Optimization Approaches for the Traveling Salesman Problem with Drone", Transportation Science, Published Online: Apr. 6, 2018, pp. 965-981, <https://doi.org/10.1287/trsc.2017.0791>.

Agatz, Niels, "The benefits of combining drones and trucks for deliveries", Apr. 30, 2018, 3 pages, printed on Jun. 26, 2019,

(56) References Cited

OTHER PUBLICATIONS

<https://discovery.rsm.nl/articles/detail/344-the-benefits-of-combining-drones-and-trucks-for-deliveries/>.
Forni et al., "Gartner Says Almost 3 Million Personal and Commercial Drones Will Be Shipped in 2017", Stamford, Conn., Feb. 9, 2017, 4 pages, <https://www.gartner.com/en/newsroom/press-releases/2017-02-09-gartner-says-almost-3-million-personal-and-commercial-drones-will-be-shipped-in-2017>.
Mell et al., "The NIST Definition of Cloud Computing", Recommendations of the National Institute of Standards and Technology, Special Publication 800-145, Sep. 2011, 7 pages.
Rouse, Margaret, "drone (unmanned aerial vehicle, UAV)", IoT Agenda.com, Oct. 31, 2018, 5 pages, <https://internetofthingsagenda.techtarget.com/definition/drone?vgnextfmt=print>.
Sankra, Puga, "Drones in Distribution Centers: Has the Time Arrived?", Smart Gladiator Mobile IOT Wearable for Supply Chain, Feb. 28, 2018, 5 pages.

* cited by examiner

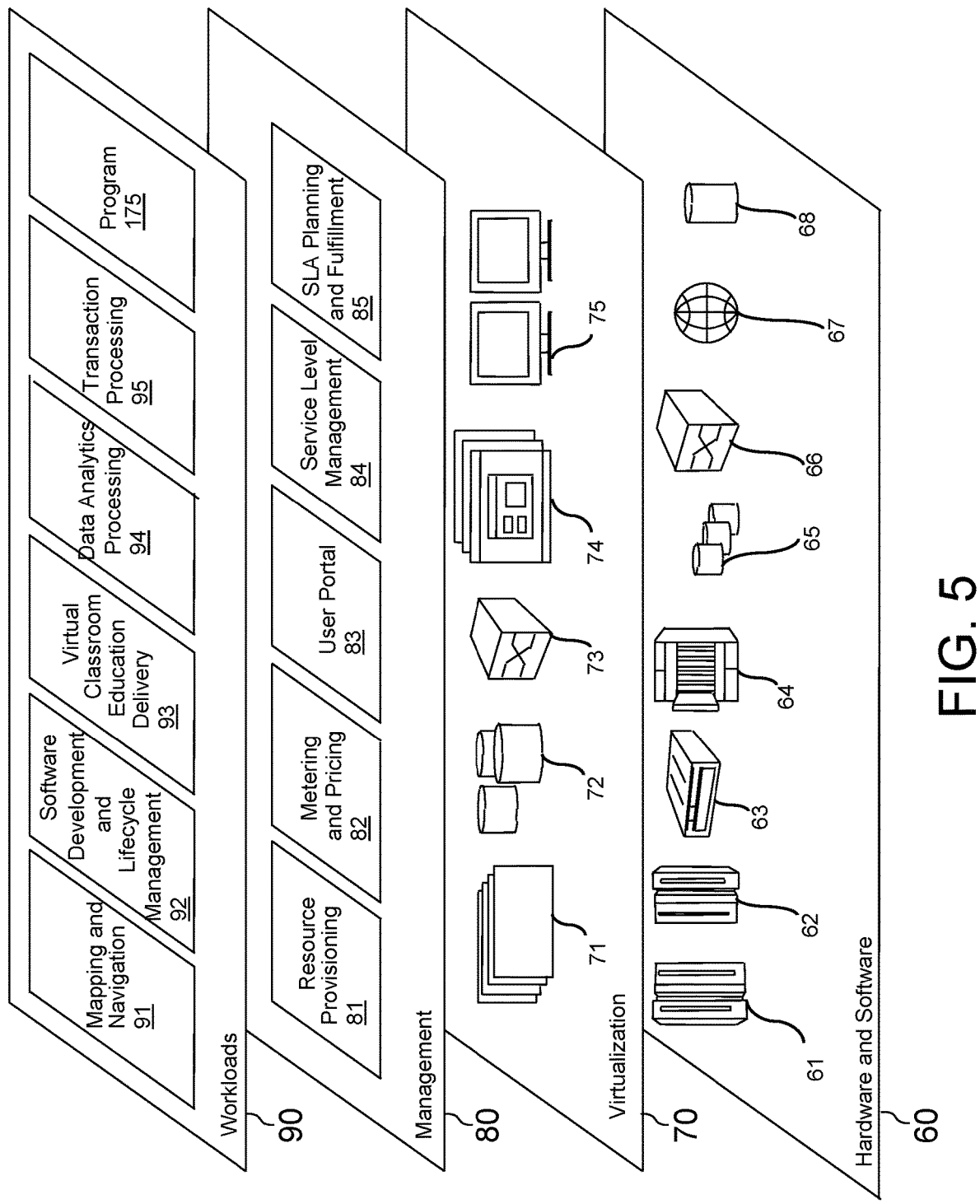

REBALANCING AUTONOMOUS VEHICLES ACCORDING TO LAST-MILE DELIVERY DEMAND

BACKGROUND

The disclosure relates generally to distributing unmanned vehicles using hybrid transportation. The disclosure relates particularly to executing the redistribution of unmanned vehicles according to vehicle demand requirements using multi-hop transportation.

Crewless vehicles (CV), both autonomously and remotely controlled, are being adopted for a wide range of applications. Such CV may be airborne, or ground based. Among these applications is the delivery of goods.

SUMMARY

Aspects of the invention disclose methods, systems and computer readable media associated with distributing and rebalancing crewless vehicles (CV) by receiving a CV demand-availability gap, identifying a candidate CV to relocate to close the CV demand-availability gap, identifying a candidate transport to relocate the CV to close the CV demand-availability gap, generating a candidate CV relocation plan, optimizing an overall CV relocation plan, and executing the overall CV relocation plan.

BRIEF DESCRIPTION OF THE DRAWINGS

FIG. 5 depicts abstraction model layers, according to at least one embodiment of the invention.

DETAILED DESCRIPTION

Figure 1:
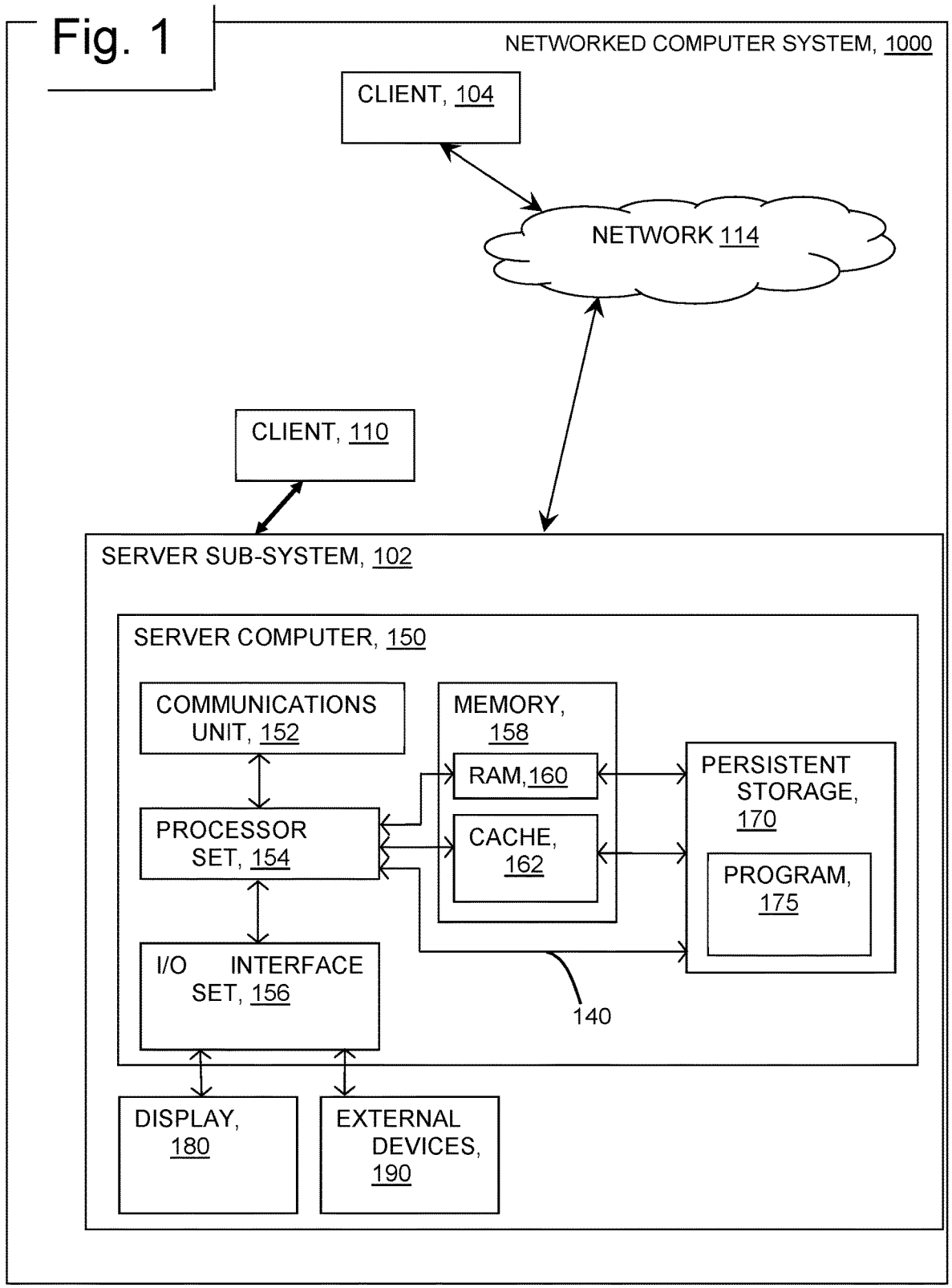
FIG. 1 provides a schematic illustration of a system, according to at least one embodiment of the invention.

Crewless vehicles (CV) include remotely piloted vehicles as well as vehicles controlled at least partially using embedded autonomous software and location sensor inputs including such data as Global Positioning System (GPS) and light detection and ranging (LIDAR) data to monitor the position of the vehicle for the guidance system.

Systems of CV can be used to deliver goods over the 'last mile' of the overall journey of the goods to the final recipient. The last mile refers to the final leg of the delivery path of the goods. Such systems include finite numbers of CV, each having a geographic base station location. For any time-interval, the delivery tasks of the system can be considered in terms of the number of CV required, as well as the necessary payload, delivery range, and altitude capabilities of the individual CV. Fleet vehicle systems can become unbalanced, where the number and type of available CV does not match the necessary tasks of the approaching time interval. The overall system of CV can include the necessary number and type of vehicles needed to complete all the tasks for the time-interval, but the necessary vehicles may not be located in places where they will be available to complete the necessary tasks. Local CV shortages can occur leading to service failures due to a lack of sufficient or proper vehicles. Optimizing the locations of the CV by rebalancing their locations according to upcoming planned demand can reduce overall system operating costs while also ensuring maximum on-time services, such as delivery of goods as promised. Rebalancing refers to the redistribution of CV, or other distributed resources, in order to satisfactorily meet demand for the resources across a specified geographic area. Ongoing optimization of the CV of a system reduces the number of CV needed to complete the tasks assigned to the system. What is needed is a method to rebalance the fleet of CV across the system on an ongoing basis to ensure that the vehicles needed to complete all planned system tasks for upcoming time-intervals are located in the right places.

In an embodiment, large vehicle transports, including over-the-road tractor trailers, are able to carry one or more CV from one location to another. In an embodiment, the transports include CV refueling capabilities, such as CV docking stations to facilitate battery charging or the refilling of gaseous or liquid fuel reservoirs. In this embodiment, the transports also include facilities for the CV to board and exit the transport. In this embodiment, airborne CV land and take off again from the transports, while ground based CV drive on and drive off the transports or are picked up and dropped off by the transport vehicle. In an embodiment, the transports are locally operated by a driver. In an embodiment, the transports are remotely operated, or autonomously controlled by embedded software and location data including LIDAR and GPS data.

In an embodiment, transports are used in conjunction with 'last mile' CV to optimize deliveries. CV have limited range and the use of the transport effectively extends the range of the CV without adding the need for CV fueling locations and time necessary for CV refueling. Local regulatory restrictions regarding airborne vehicle, such as restrictions near airports, can be addressed using the transports to move the CV and payload through as much of the area under restrictions, using the CV only for finishing the delivery within the requirements of the restrictions.

In some areas, the terrain requires the use of high-altitude CV capable of carrying their payload to mountainous locations. Travel at higher elevations can reduce the effective range of an airborne CV. Transports can reduce the necessary flight paths in such situations enabling CV to make the required deliveries.

The disclosed systems and methods determine and execute the optimal rebalancing of a fleet of CV according to the real-time demands upon the fleet. The systems and methods utilize a combination CV and transport vehicles for multi-hop transport, where CV merge automatically with a transport, are carried to a new location by the transport according to known, upcoming CV demand requirements, and then complete the tasks of the demand requirements after leaving the transport, delivering a payload to its final destination.

In an embodiment, the CV, base stations, transports and distribution enters each communicate with a rebalancing system. The rebalancing system includes sufficient computing resources to communicate with the system elements and to perform the necessary tasks associated with the method of ongoing rebalancing of the system assets. In an embodiment, the rebalancing system is distributed across cloud-based resources and also includes edge cloud resources for local communications and computing tasks. In an embodiment, the system is centralized, and all element communications are routed to a central computing server.

In an embodiment, the method determines a demand-availability gap according to the planned and predicted system asset needs for different geographic areas for a selected time. For example, the number of planned and predicted delivery CV for different base station areas for the next day is determined. The determination uses known asset-based tasks which are in process as well as predicted tasks based upon historical data associated with the time of year and any special events—holidays—which are coming up on the calendar. The determination also considers the specific needs associated with each planned task—the range of a CV necessary for a particular delivery, the operational ceiling of a CV for a delivery to a mountain top location, etc. The method considers the number of available CV, their capabilities, round trip timing associated with planned tasks, refueling timing associated with the CV, etc. in determining the capacity of the currently available CV to accomplish all planned and predicted tasks. The difference between the planned and predicted tasks and the capacity of the currently available assets is the demand-availability gap.

In an embodiment, a pre-determined demand-availability gap defining the difference between available and necessary system assets is provided. The provided demand-availability gap is determined by other systems and provided to the rebalancing system elements.

In an embodiment, the method identifies candidate CV for closing the determined demand-availability gap. In this embodiment, the method identifies surplus CV at a base station location, in terms of the planned and predicted tasks for that location for the selected time period, as candidate CV. The method identifies candidate CV according to their current base station location, estimated time of availability, and the type of CV—the capabilities of the CV in terms of payload, number of compartments, operational range and ceiling, fuel status, etc. In an embodiment, the method creates a matrix of data associated with the identified candidate CV. Matrix elements can include candidate CV identifying information as well as candidate relocation destination information to close the demand-availability gap.

In an embodiment, the method identifies one or more candidate transport vehicles for each candidate CV. In this embodiment, the method identifies transports as candidates according to their current and planned locations, their compatibility with the candidate CV, and their planned CV utilization. Current and planned locations relate to the current location of the transport relative to the candidate CV, as well as the ongoing relative location of the transport-candidate CV pairing, as each traverses their planned routings prior to the selected time period.

In an embodiment, the method also considers the planned routing of the transport relative to the required destination of the candidate CV in selecting candidate transports. CV compatibility refers to the ability of the transport to receive a specific candidate CV, including any capacity to refuel the CV while it is in transit on the transport. In this embodiment, the method identifies transports having compatibility with a CV and a planned location near the operating area of the CV's current base station as candidates for receiving and transporting the CV. In an embodiment, the method appends the candidate transport data as additional data for each candidate CV relocation-destination element of the candidate CV matrix.

In an embodiment, the method generates relocation plans for each candidate CV, destination and transport vehicle combination. In this embodiment, the method generates each relocation plan taking the current and desired CV locations, CV fuel level and maximum range, operating capabilities, local regulations regarding CV operation, transport vehicle current and planned location, and transport vehicle CV refueling capabilities. In an embodiment, the method generates CV relocation plans with one or more transport vehicles being used to relocate a CV to its new base station. In an embodiment, the generated relocation plan includes the CV transporting itself to a new base station within the operating range of the CV. In an embodiment, the generation of relocation plans for each CV, relocation destination combination includes a calculation of the cost of the relocation plan. The cost calculation takes into consideration costs associated with CV usage according to travel distance and operating time, CV fuel use, including CV refueling, transport vehicle travel distance and operating time, transport vehicle re-routing distance, transport waiting times, etc. In an embodiment, the method appends the CV relocation plans to the data matrix of the method, adding relocation plan options and cost information to each matrix entry for a CV, relocation destination pairing. In an embodiment, the CV relocation plan includes the CV moving from its current, first location, to a location of a transport vehicle, and boarding the transport vehicle under its own power, being carried to an intermediate drop-off destination, in some instances while concurrently refueling, and departing the transport vehicle under its own power, arriving at the relocation destination.

In an embodiment, the method optimizes the set of generated CV relocation plan options into an overall CV relocation plan for execution. In one embodiment, the method optimizes the set of relocation plans to close the demand-availability gap at the lowest possible total cost. In this embodiment, the method determines the total cost as a combination of the costs of the individual CV relocation plans combined into the overall relocation plan. The method optimizes overall relocation plan according to minimizing unused CV, thereby maintaining all CV at about the same average usage level. In an embodiment, the method optimizes the overall plan to reduce or minimize delivery delays across the system of operations. In an embodiment, the method optimizes the overall plan around minimizing the number of CV needing to be relocated at the expense of increased delivery delays. In an embodiment, the method selects combinations of these factors as the drivers behind the optimization function.

The optimization function itself begins with the matrix of candidate relocation plans as an input to create the optimized overall relocation plan output. In an embodiment, the method uses a multi-objective function. The overall cost-vector, the sum of the cost vectors of the individual candidate CV relocation plans, is minimized. In this embodiment, the method expresses demand requirements as part of the multi-objective function. In an embodiment, a different factor can be selected, as described above, either in place of overall cost or in conjunction with the overall cost. In an embodiment, the user selects the factors to be optimized and in embodiments where multiple factors are selected, the user assigns priorities to the selected factors for optimization. The possible combinations of relocation plans from the matrix are considered in view of the factors selected for optimization and the priority assigned to the factors selected.

In an embodiment, the method optimizes the overall relocation plan by considering satisfaction of the demand-availability gap requirements, having each CV of a fleet complete a specified number of system tasks prior to any relocation of the CV, the planned timing and routes of the transport vehicles, the planned timing and routes of the CV, the CV fuel levels and maximum ranges, CV refueling station availability, and CV usage regulations. In an embodiment, a user selects which factors to consider and how the chosen factors should be prioritized in determining the optimized overall plan. In an embodiment, historical selection data associated with the user is used by the method to make default selections. In this embodiment, the default selections are approved or altered by the user.

In an embodiment, the overall optimized relocation plan includes routing strategies of each candidate CV and transport vehicle selected for relocation. In this embodiment, the method communicates routings to the CV and transport vehicles as well as to distribution centers and base stations. In an embodiment, the method assigns multiple tasks in a queue to CV and transport vehicles. In this embodiment, the method appends latest the relocation routing to the task queue. The method then monitors the execution of the relocation routings using real-time location data from the selected CV and transport vehicles. Deviations from the relocation routing in terms of CV and transport location and timing can result in a new demand-availability gap which the method then addresses with a new round of candidate selection, relocation plan generation, optimization and execution to close the new gap. In an embodiment, higher or lower than predicted asset demand can also lead to a new or revised demand-availability gap which the method then addresses.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise asset rebalancing program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the asset rebalancing program 175, are stored in persistent storage 170 for execution and/or access by one or more of the respective processor(s) 154 of server computer 150 via cache 162. Asset rebalancing software 175 includes a set of software modules. In an embodiment, these modules include a CV and transport vehicle real-time tracking module, CV and transport vehicle operational plans storage module, CV and transport vehicle candidate identification modules, CV and transport vehicle relocation cost calculation modules, and CV routing strategy/relocation plan calculation module.

In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., asset rebalancing program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
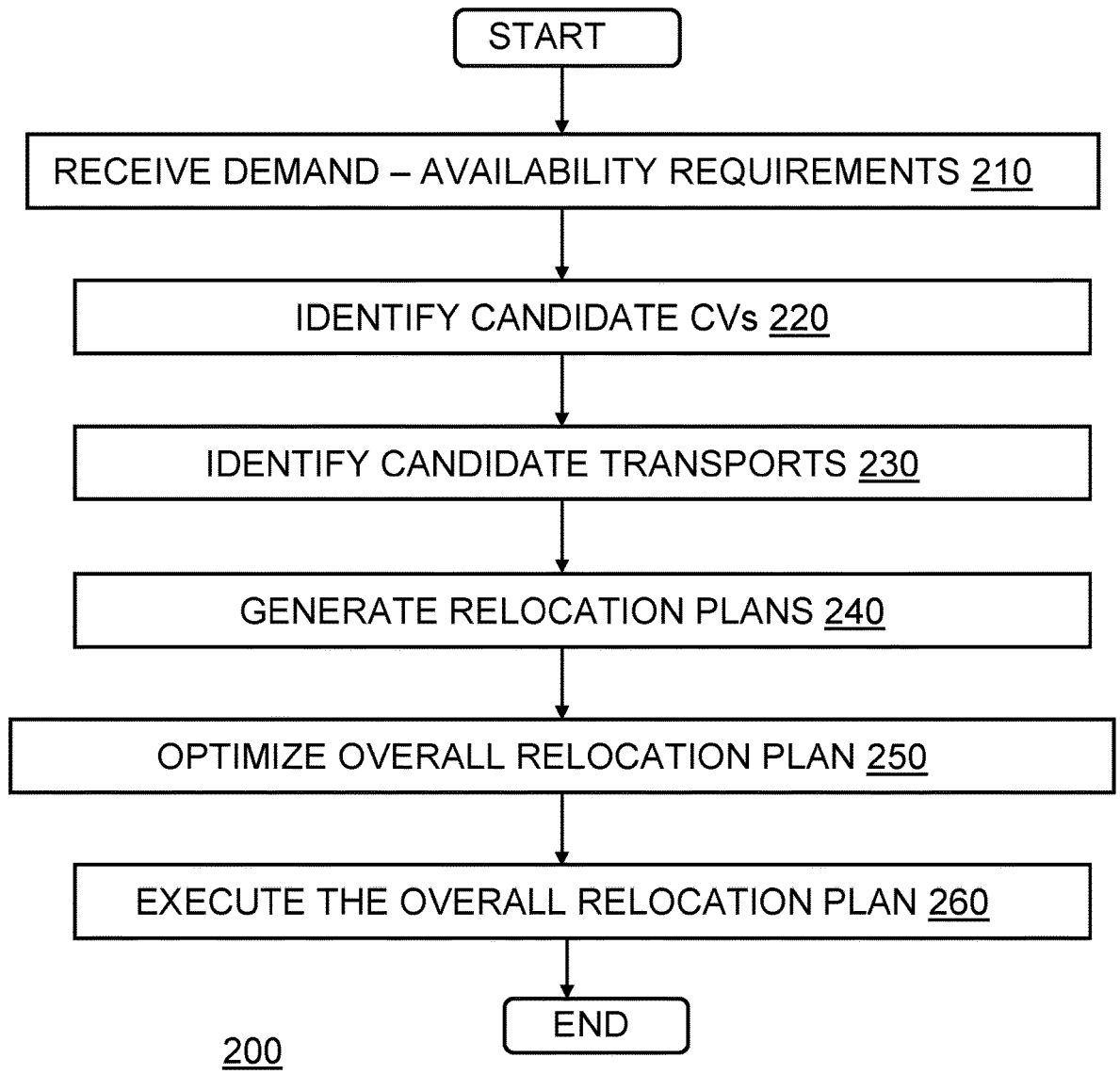
FIG. 2 provides a flowchart depicting an operational sequence, according to at least one embodiment of the invention.

FIG. 2 provides a flowchart 200, illustrating exemplary activities associated with the practice of the disclosure. In an embodiment, at 210, program 175 of the method receives CV demand requirements and availability. Program 175 of the method derives CV demand-availability gap from this information. In one embodiment, program 175 of the method receives the demand-availability gap which is determined elsewhere. Program 175 of the method identifies candidate CV for relocation at 220 according to the CV features and capabilities, payload capacity, maximum range, current fuel level, current and planned activity, etc. At 230, program 175 of the method identifies candidate transports according to the transport location, route, destination, location timeline, etc. At 240, program 175 of the method generates a plurality of candidate CV relocation plans. The generated plurality of plans take into consideration the potential CV-transport meeting points and times, CV trajectories needed to meet the transport, and the costs associated with different potential plans. At 250, program 175 of the method optimizes the plurality of CV relocation plans to produce an overall CV relocation plan which includes one or more of the candidate CV relocation plans. Program 175 of the method optimizes the overall plan around one or more of: minimizing unused CV in order to distribute the work load and vehicle usage evenly across the entire fleet of available vehicles; minimizing overall relocation costs by finding the combination of relocation plans which combine with the lowest overall cost, minimizing delays associated with the tasks of the CV, whether those tasks are associated with passengers or packages, minimizing the number of CV to relocate in order to maintain local CV fleets as much as possible and to reduce excessive transport use, and minimizing the demand-availability gap by eliminating as much of the originally determined demand-availability gap as possible. At 260, the method executes the optimized overall relocation plan. In an embodiment, the method passes the candidate CV relocation plans which constitute the optimized overall plan to the individual elements of the system for execution resulting in relocation of the selected candidates according to the chosen plans.

In an embodiment, the overall CV relocation plan considers one or more of a group of factors. The group can include satisfying a number of demand requirements for CV in varying quantities at different locations and at specific times (i.e., different payload capacities, operating ceilings, payload compartments, etc.). The group can include individual CV completing a specified predetermined number of tasks before being available for transfer to another location. The optimization can include consideration of planned routes and timing of the CV transport vehicles as well as the planned routes and timing of the CV themselves. CV and transport planned routes and timing can facilitate the convergence of CV and transports at a common location after each has completed a task. CV fuel status, maximum range and the availability of CV refueling options can also be considered when optimizing the overall CV relocation plan. The group can also include relevant CV regulations such that the overall plan does not lead to activity in violation of such regulations.

In an embodiment, the method is iterative. After the method optimizes the overall relocation plan, the method reviews the demand-availability gap in view of the optimized plan. The method then addresses any remaining demand-availability gap by iterating through steps 220-250 to reduce or eliminate the remaining demand-availability gap. In this embodiment, the iterative nature of the process yields a set of relocation plans, the initial plan, which closes a portion of the gap, and additional plans which close the remainder of the gap. In an embodiment, a single optimized overall relocation plan closes the entire demand-availability gap.

Figure 3:
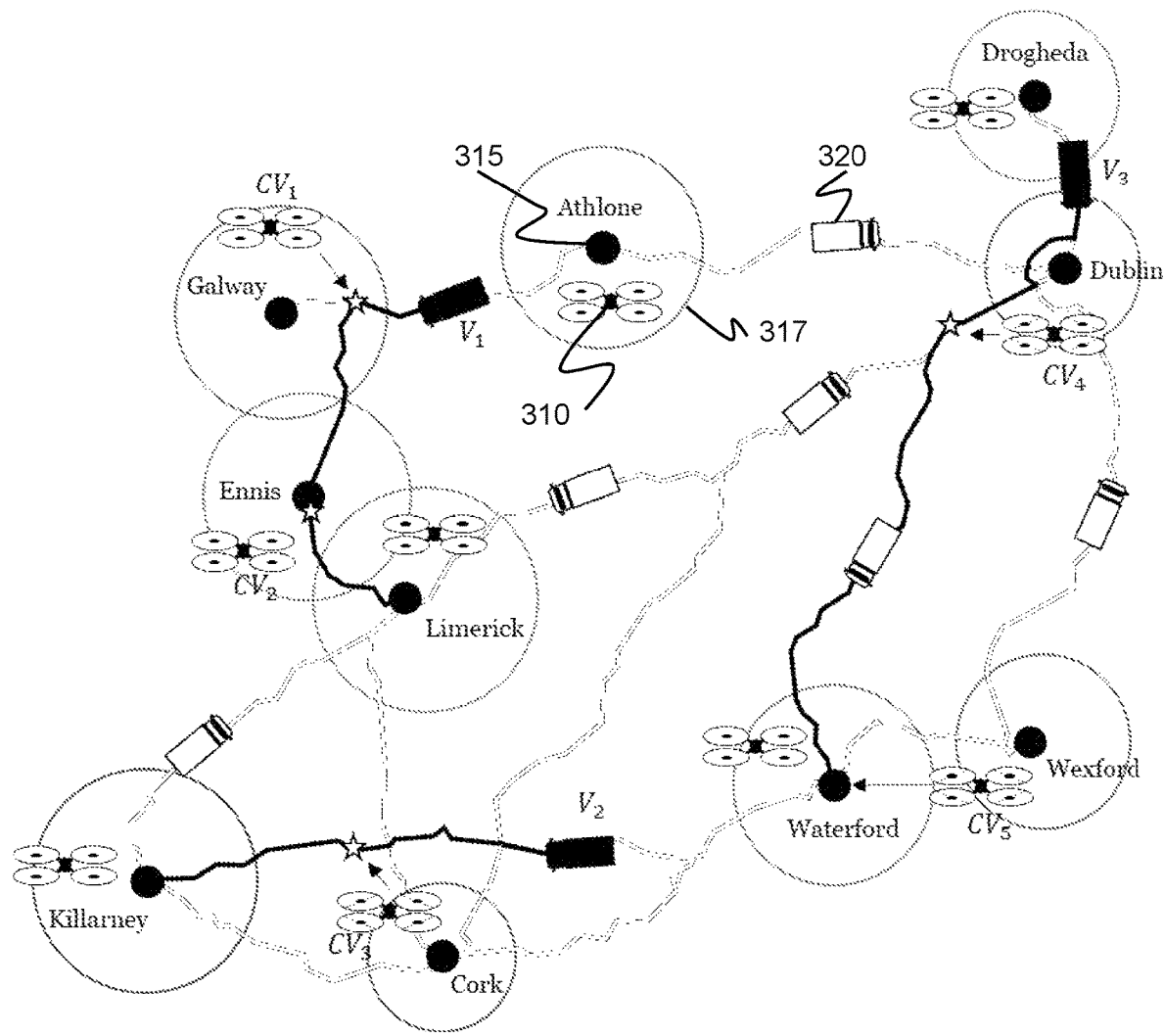
FIG. 3 provides a schematic illustration of an exemplary geographic area and system elements, according to at least one embodiment of the invention.

As an example, FIG. 3 illustrates a geographic area served by a fleet of CV 310, including CV: $CV_1$-$CV_5$, and transports 320, including transports $V_1$-$V_3$, to provide delivery services. The CV have varying payload, number of compartments, battery life, range, operating ceiling, etc. The CV are geographically distributed across the broader area and operate from base stations 315, serving local areas 317 surrounding the base stations 315. Transport vehicles 320 travel between distribution venters (not shown) and the base stations 315, delivering goods for final delivery by the CV. Demand for CV 310 at each base station 315, varies over time according to the number and type of deliveries needed from each base station 315 during any specified time-interval.

According to the planned deliveries of the example, additional CV will be needed in Limerick, Killarney, and Waterford in a day. In an embodiment, the method expresses the demand in each base station in terms of the number of parcels, their weights, distance from base station to destination, and required flight altitude. For example, one of the CV required in Killarney needs to be able to fly up to 500 meters, to serve areas surrounding the Kerry mountains. For the example, presume that CV $D_3$ satisfies this constraint.

CV 310 will need to be relocated from the other cities (having spare CV) to Limerick, Killarney, and Waterford by the end of the day to satisfy the following day's demand requirements. The system identifies the candidate CV 310 that may be relocated based on their capabilities and on the demand requirements of each CV current base station 315, location. The system identifies the candidate transports 320 that may pick up the CV 310 on their way to or through the relocation destinations. The system formalizes and solves the corresponding optimization problem and computes an optimum plan for relocating CV: the CV to relocate, how to relocate them (e.g., CV 310 to fly to destination, or to be carried onboard a truck 320), the trucks 320 to carry the CV 310, the meeting points and times, etc.

For example: $CV_1$ is to meet transport $V_1$ at location $L_1$ and time $t_1$, to be carried to Limerick or somewhere near it, and so on. $CV_5$ may be requested to fly to Waterford directly (if possible, considering fuel and operating range constraints).

The method monitors the execution of the relocation plan and adjusts the meeting locations and times in real time as needed (e.g., in case of vehicle or CV delays, CV unavailability, etc.).

In an embodiment, as an initial matter, the method determines the demand-availability gap as a function of predicted or planned CV requests for a specified time-interval together with the predicted or planned CV, availability for the same time-interval. The demand-availability gap includes CV surpluses and shortages by base station, and CV capability, for the time interval.

Table 1 provides the details of the demand-availability gap for the example.

TABLE 1

| Demand-availability gap | |
|---|---|
| Shortage | |
| Killarney: | 1 high-altitude (>500 meters CV |
| Limerick: | 3 standard CV |
| Waterford: | 1 standard CV, 1 large CV |
| Sufficiency | |
| Athlone: | no shortage, no surplus |
| Drogheda: | no shortage, no surplus |
| Surplus | |
| Cork: | 3 CV, possibly 1 high-altitude CV |
| Dublin: | 2 CV, 1 large CV |

TABLE 1-continued

Demand-availability gap

| | |
|---|---|
| Ennis: | 1 CV standard or high-altitude |
| Galway: | 3 standard CV |
| Wexford: | 2 standard CV |

In an embodiment, the method identifies candidate CV for relocation from the demand-availability gap output as well as the CV capability data and the CV planned tasks including CV availability information. The output includes a matrix of potential relocation destination assignments for available CV in order to satisfy the identified demand requirements in terms of quantity and type of CV. Table 2 illustrates the output of candidate CV information for the example.

In the tables, a subscript is used to indicate the current assigned base station of the CV. The superscript is used to distinguish multiple CV having a common current assigned location. For transport vehicles, V, the subscript is used to distinguish the respective transport vehicles, the superscript is used to distinguish different potential relocation assignments for each transport vehicle. Relocation plan P, and costs c, subscripts distinguish between respective plans and their associated costs.

TABLE 2

Candidate CV:

| | Candidate destinations | | |
|---|---|---|---|
| CV (locations, type, time available) | Killarney | Limerick | Waterford |
| $CV_1$ (Galway, standard, 1500) | | x | x |
| $CV^2_1$ (Galway, standard, 1600) | | x | x |
| $CV^3_1$ (Galway, standard, 1630) | | x | x |
| $CV_2$ (Ennis, standard, 1430) | | x | x |
| $CV^2_2$ (Ennis, high-altitude, 1400) | x | | |
| $CV_3$ (Cork, high-altitude, 1530) | x | | |
| $CV^2_3$ (Cork, standard, 12:45) | | x | x |
| $CV^3_3$ (Cork, standard, 1700) | | x | x |
| $CV_4$ (Dublin, large, 1300) | | | x |
| $CV^2_4$ (Dublin, standard, 1200) | | x | x |
| $CV^3_5$ (Wexford, standard, 1400) | | x | x |

In an embodiment, the method identifies candidate transport vehicles. The matrix of candidate CV data and planned truck transport routes and times are used as inputs. A matrix of available CV, candidate destinations and specific transport vehicles is created. Table 3 illustrates the candidate transport vehicle output for the example. (Candidate transport vehicles $V_4$-$V_6$ and their associated routes are not shown in FIG. 3).

TABLE 3

Candidate transport vehicles:

| | Candidate destinations | | |
|---|---|---|---|
| CV (locations, type, time available) | Killarney | Limerick | Waterford |
| $CV_1$ (Galway, standard, 1500) | | $V_1$ | None |
| $CV^2_1$ (Galway, standard, 1600) | | $V_1$ | None |
| $CV^3_1$ (Galway, standard, 1630) | | None | None |
| $CV_2$ (Ennis, standard, 1430) | | $V_1$ or $V^1_1$ | None |
| $CV^2_2$ (Ennis, high-altitude, 1400) | $V_4$ | | |
| $CV_3$ (Cork, high-altitude, 1530) | $V_2$ | | |
| $CV^2_3$ (Cork, standard, 12:45) | | $V_5$ | $V^2_5$ |
| $CV^3_3$ (Cork, standard, 1700) | | None | $V^2_5$ |
| $CV_4$ (Dublin, large, 1300) | | | $V_3$ or $V^2_3$ |

TABLE 3-continued

Candidate transport vehicles:

| | Candidate destinations | | |
|---|---|---|---|
| CV (locations, type, time available) | Killarney | Limerick | Waterford |
| $CV^2_4$ (Dublin, standard, 1200) | | $V_6$ | None |
| $CV^3_5$ (Wexford, standard, 1400) | | None | $CV_5$ |

In an embodiment, the method prepares candidate relocation plans for each CV-transport combination using the matrix output of candidate transport vehicles, the CV expected fuels (e.g., battery) levels, and flying ranges, together with the planned transport routes and timings. The candidate relocation plans include cost estimates for each planned relocation including costs associated with CV travel distance, transport travel distance, transport re-routing distance, transport waiting times, etc. In this embodiment, the method creates candidate relocation plans sing known approaches such as the Dial a Ride Problem with Transfer. Table 4 illustrates the generalized output of the candidate routing plan activity. In the table, $P_n$ represents the $n^{th}$ candidate plan, having a cost of $c_n$.

TABLE 4

Candidate routing plans:

| | Candidate destinations | | |
|---|---|---|---|
| CV (locations, type, time available) | Killarney | Limerick | Waterford |
| $CV_1$ (Galway, standard, 1500) | | $V_1, P_1, c_1$ | None |
| $CV^2_1$ (Galway, standard, 1600) | | $V_1, P_2, C_2$ | None |
| $CV^3_1$ (Galway, standard, 1630) | | None | None |
| $CV_2$ (Ennis, standard, 1430) | | $V_1, P_3, c_3$ or $V^1_1, P_4, c_4$ | None |
| $CV^2_2$ (Ennis, high-altitude, 1400) | $V_4, P_5, c_5$ | | |
| $CV_3$ (Cork, high-altitude, 1530) | $V_2, P_6, c_6$ | | |
| $CV^2_3$ (Cork, standard, 12:45) | | $V_5, P_7, c_7$ | $V^2_5, P_8, c_8$ |
| $CV^3_3$ (Cork, standard, 1700) | | None | $V^2_5, P_9, c_9$ |
| $CV_4$ (Dublin, large, 1300) | | | $V_3, P_{10}, c_{10}$ or $V^2_3, P_{11}, c_{11}$ |
| $CV^2_4$ (Dublin, standard, 1200) | | $V_6, P_{12}, c_{12}$ | None |
| $CV^3_5$ (Wexford, standard, 1400) | | None | $CV_5, P_{13}, c_{13}$ |

In an embodiment, the method combines the candidate relocation plans and optimized into an overall relocation plan to reduce, or close, the overall demand-availability gap together with other selected factors. The method takes the matrix of candidate relocation plans as an input to create the optimized overall relocation plan output. In this embodiment, a multi-objective function is used. The method minimizes the overall cost vector—the sum of the cost vectors of the individual candidate CV relocation plans. The method expresses demand requirements as part of the multi-objective function. In one embodiment, the method expresses the demand requirements as a set of constraints upon the multi-objective function. The method can assign CV to themselves, to a single transport, or to a set of transport vehicles, for relocation. A single transport vehicle can carry multiple CV as part of the optimized relocation plan.

In an embodiment, the optimized plan is executed by issuing destination and timing instructions to the selected CV and transports forming portions of the optimized relocation plan. The selected CV and transports proceed according to their instructions. The CV board the transports and are carried to intermediate destinations from which they proceed to new base stations for delivery payload assignments. In this embodiment, the system tracks the locations and fuel status of the CV and transports throughout the execution of the plan to monitor the progress of the relocation plan and to determine if revisions to the relocation plan are necessary to close the demand-availability gap.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
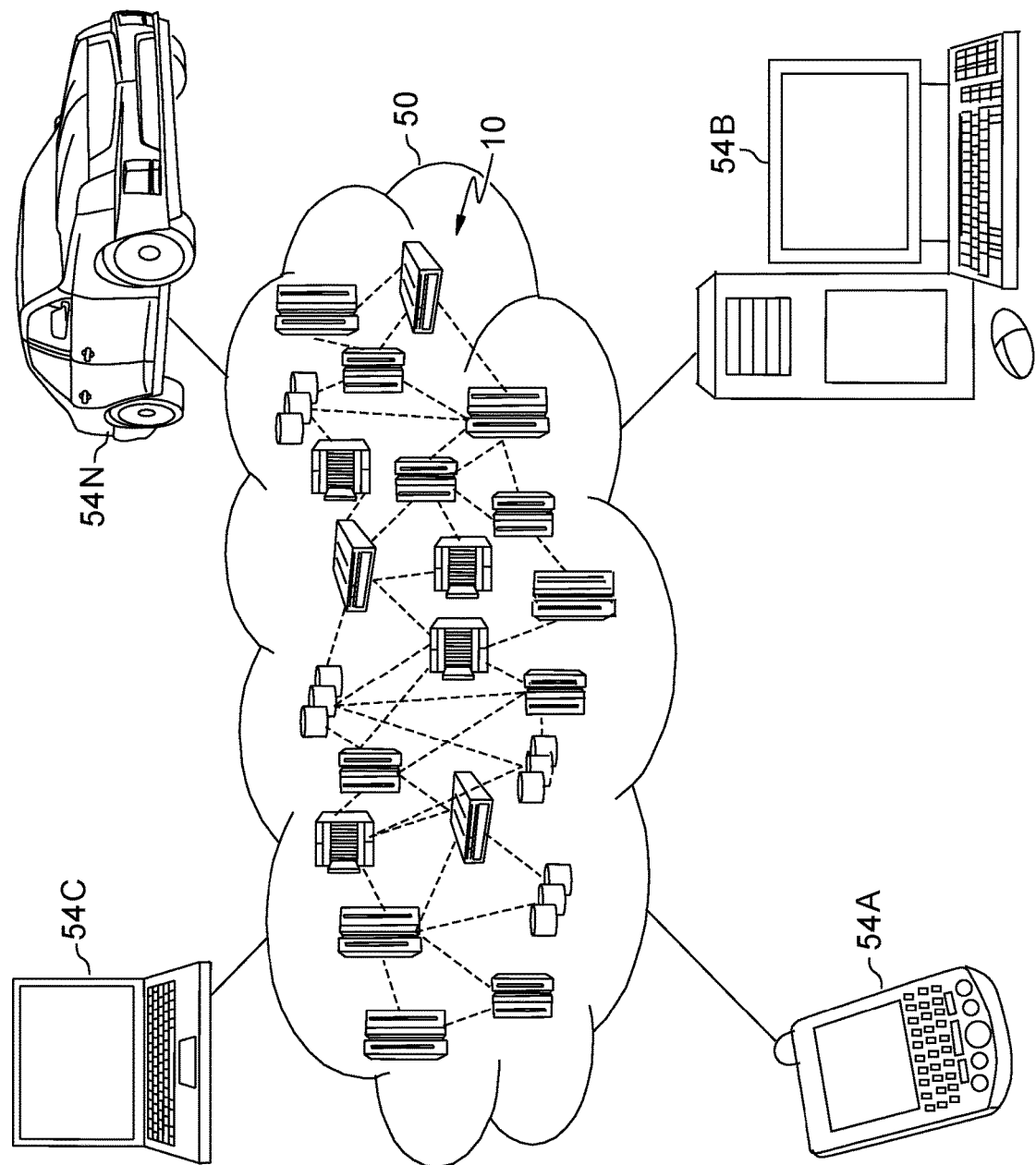
FIG. 4 depicts a cloud computing environment, according to at least one embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asset rebalancing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for distributing crewless vehicles (CV), the method comprising:
   receiving, by one or more computer processors, a CV demand-availability gap, wherein the CV demand-availability gap comprises CV demand according to future goods delivery tasks;
   identifying, by the one or more computer processors, a candidate CV to relocate to close the CV demand-availability gap, wherein the CV comprises a surplus autonomous vehicle at a base station;
   identifying, by the one or more computer processors, a candidate transport vehicle according to at least one of: transport vehicle current and planned locations compatibility with the candidate CV, and planned transport vehicle CV utilization, to relocate the CV to close the CV demand-availability gap;
   generating, by the one or more computer processors, a plurality of candidate CV relocation plans with one or more transport vehicles being used to relocate a CV to a new base station;
   optimizing, by the one or more computer processors, an overall CV relocation plan comprising a candidate CV relocation plan, wherein optimizing the overall CV relocation plan considers a factor selected from the group consisting of: satisfying a number of demand requirements a CV completing a number of tasks before being relocated planned timing and routes of transport vehicles, planned timing and routes of CV, CV fuel level and maximum range, CV refueling station availability, and CV regulatory restrictions; and
   executing, by the one or more computer processors, the overall CV relocation plan with one or more transport vehicles being used to relocate at least one CV to a new base station.

2. The computer implemented method according to claim 1 wherein the CV demand-availability gap considers factors selected from the group consisting of: a number of CV required, capabilities of the CV required, and times and location at which CV are required.

3. The computer implemented method according to claim 1 wherein a candidate CV relocation plan includes an element selected from the group consisting of: a CV moving under its own power from a first location to a location of a transport vehicle, the CV boarding the transport vehicle, transporting the CV to a drop-off location, and the CV moving under its own power from the drop-off location to a final location.

4. The computer implemented method according to claim 1, wherein the CV relocation plan is generated according to CV fuel level and maximum range.

5. The computer implemented method according to claim 1, wherein the CV relocation plan is generated considering refueling the CV in transport.

6. The computer implemented method according to claim 1, wherein the overall CV relocation plan is optimized according to a factor selected from the group consisting of: minimizing unused CV, minimizing overall relocation costs, minimizing delays, minimizing a number of CV to relocate, and minimizing the demand-availability gap.

7. A computer program product for distributing crewless vehicles (CV), the computer program product comprising one or more computer readable storage devices and stored program instructions on the one or more computer readable storage devices, the stored program instructions comprising:
- program instructions for receiving a CV demand-availability gap, wherein the CV demand-availability gap comprises CV demand according to future goods delivery tasks;
- program instructions for identifying a candidate CV to relocate to close the CV demand-availability gap, wherein the CV comprises a surplus autonomous vehicle at a base station;
- program instructions for identifying a candidate transport vehicle to relocate the CV to close the CV demand-availability gap according to at least one of: transport vehicle current and planned locations, compatibility with the candidate CV, and planned transport vehicle CV utilization;
- program instructions for generating a plurality of candidate CV relocation plans with one or more transport vehicles being used to relocate a CV to a new base station;
- program instructions for optimizing an overall CV relocation plan comprising a candidate CV relocation plan, wherein optimizing the overall CV relocation plan considers a factor selected from the group consisting of: satisfying a number of demand requirements, a CV completing a number of tasks before being relocated, planned timing and routes of transport vehicles, planned timing and routes of CV, CV fuel level and maximum range, CV refueling station availability, and CV regulatory restrictions; and
- program instructions for executing the overall CV relocation plan with one or more transport vehicles being used to relocate at least one CV to a new base station.

8. The computer program product according to claim 7, wherein the CV demand-availability gap considers factors selected from the group consisting of: a number of CV required, capabilities of the CV required, and times and location at which CV are required.

9. The computer program product according to claim 7, wherein a candidate CV relocation plan includes an element selected from the group consisting of: a CV moving under its own power from a first location to a location of a transport vehicle, boarding the transport vehicle, transporting the CV to a drop-off location, and the CV moving under its own power from the drop-off location to a final location.

10. The computer program product according to claim 7, wherein the CV relocation plan is generated according to CV fuel level and maximum range.

11. The computer program product according to claim 7, wherein the CV relocation plan is generated considering refueling the CV in transport.

12. A computer system for distributing crewless vehicles (CV), the computer system comprising:
- one or more computer processors;
- one or more computer readable storage devices; and
- stored program instructions on the one or more computer readable storage devices for execution by the one or more computer processors, the stored program instructions comprising:
  - program instructions for receiving a CV demand-availability gap, wherein the CV demand-availability gap comprises CV demand according to future goods delivery tasks;
  - program instructions for identifying a candidate CV to relocate to close the CV demand-availability gap, wherein the CV comprises a surplus autonomous vehicle at a base station;
  - program instructions for identifying a candidate transport vehicle to relocate the CV to close the CV demand-availability gap according to at least one of: transport vehicle current and planned locations, compatibility with the candidate CV, and planned transport vehicle CV utilization;
  - program instructions for generating a plurality of candidate CV relocation plans with one or more transport vehicles being used to relocate a CV to a new base station;
  - program instructions for optimizing an overall CV relocation plan comprising a candidate CV relocation plan, wherein optimizing the overall CV relocation plan considers a factor selected from the group consisting of: satisfying a number of demand requirements, a CV completing a number of tasks before being relocated, planned timing and routes of transport vehicles, planned timing and routes of CV, CV fuel level and maximum range, CV refueling station availability, and CV regulatory restrictions; and
  - program instructions for executing the overall CV relocation plan with one or more transport vehicles being used to relocate at least one CV to a new base station.

13. The computer system according to claim 12, wherein the CV demand-availability gap considers factors selected from the group consisting of: a number of CV required, capabilities of the CV required, and times and location at which CV are required.

14. The computer system according to claim 12, wherein a candidate CV relocation plan includes an element selected from the group consisting of: a CV moving under its own power from a first location to a location of a transport vehicle, boarding the transport vehicle, transporting the CV to a drop-off location, and the CV moving under its own power from the drop-off location to a final location.

15. The computer system according to claim 12, wherein the CV relocation plan is generated according to CV fuel level and maximum range.

16. The computer system according to claim 12, wherein the CV relocation plan is generated considering refueling the CV in transport.

17. The computer system according to claim 12, wherein the overall CV relocation plan is optimized according to a factor selected from the group consisting of minimizing unused CV, minimizing overall relocation costs, minimizing delays, minimizing a number of CV to relocate, and minimizing the demand-availability gap.

18. The computer system according to claim 12, further comprising a module selected from the group consisting of: a module for tracking real time CV and transport vehicle data, a module for storing operational plans of the CV and transport vehicle, a module for identifying candidate CV, a module for identifying a candidate transport vehicle, a module for computing CV and transport vehicle relocation costs, and a module for assigning a routing strategy to a CV.

* * * * *